(12) United States Patent
Yang et al.

(10) Patent No.: US 10,372,136 B2
(45) Date of Patent: Aug. 6, 2019

(54) LOCAL TRAJECTORY PLANNING METHOD AND APPARATUS FOR SMART VEHICLES

(71) Applicant: BAIDU ONLINE NETWORK TECHNOLOGY (BEIJING) CO., LTD., Beijing (CN)

(72) Inventors: Wenli Yang, Beijing (CN); Tianlei Zhang, Beijing (CN); Lintao Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 185 days.

(21) Appl. No.: 15/276,751

(22) Filed: Sep. 26, 2016

(65) Prior Publication Data
US 2017/0364083 A1 Dec. 21, 2017

(30) Foreign Application Priority Data

Jun. 21, 2016 (CN) .......................... 2016 1 0451707

(51) Int. Cl.
*G05D 1/02* (2006.01)
*B60W 30/12* (2006.01)
(Continued)

(52) U.S. Cl.
CPC ........... *G05D 1/0223* (2013.01); *B60W 30/12* (2013.01); *B60W 30/143* (2013.01);
(Continued)

(58) Field of Classification Search
None
See application file for complete search history.

(56) References Cited

U.S. PATENT DOCUMENTS

| 5,170,351 A | 12/1992 | Nemoto et al. |
| 6,256,560 B1 | 7/2001 | Kim et al. |

(Continued)

FOREIGN PATENT DOCUMENTS

| CN | 101883326 A | 11/2010 |
| CN | 103383567 | 11/2013 |
| CN | 105151043 A | 12/2015 |

OTHER PUBLICATIONS

From CN App. No. 201610451707.3, First Office Action and Search Report, dated Feb. 23, 2017, and its machine English translation from Global Dossier.

(Continued)

*Primary Examiner* — Redhwan K Mawari
*Assistant Examiner* — Edward Torchinsky
(74) *Attorney, Agent, or Firm* — Ladas & Parry, LLP (57) ABSTRACT

The present invention provides a local trajectory planning method and apparatus for a smart vehicle, pre-acquiring path planning information from a starting location to a destination; the method comprising: determining a target lane; sampling alternative curves from a current location of the smart vehicle to a target lane according to the path planning information; performing speed planning for the sampled alternative curves according to a current travel environment; selecting one of the alternative curves after the speed planning is performed as a target trajectory. Local trajectory planning of the smart vehicle is achieved through the present invention.

27 Claims, 3 Drawing Sheets

(51) Int. Cl.
*B60W 30/14* (2006.01)
*G01C 21/36* (2006.01)
*G08G 1/16* (2006.01)
*B62D 15/02* (2006.01)
*G01C 21/34* (2006.01)

(52) U.S. Cl.
CPC ..... *B62D 15/0255* (2013.01); *G01C 21/3407* (2013.01); *G01C 21/3691* (2013.01); *G08G 1/167* (2013.01); *B60W 2550/10* (2013.01); *B60W 2550/146* (2013.01); *B60W 2720/10* (2013.01); *B60W 2720/14* (2013.01); *G05D 2201/0213* (2013.01)

(56) References Cited

U.S. PATENT DOCUMENTS

| | | | |
|---|---|---|---|
| 2016/0090087 A1* | 3/2016 | Lee | B60W 30/143 701/93 |
| 2017/0008522 A1* | 1/2017 | Sato | B60W 10/04 |
| 2017/0308090 A1* | 10/2017 | Asakura | G01C 21/3469 |
| 2017/0313313 A1* | 11/2017 | Asakura | B60W 50/0098 |
| 2017/0349183 A1* | 12/2017 | Sen | B60K 35/00 |
| 2018/0181132 A1* | 6/2018 | Kunihiro | B62D 15/0255 |
| 2018/0194354 A1* | 7/2018 | Takeda | B60K 31/00 |
| 2018/0201271 A1* | 7/2018 | Ishioka | B60W 30/10 |
| 2018/0281785 A1* | 10/2018 | Berntorp | G08G 1/166 |
| 2018/0286242 A1* | 10/2018 | Talamonti | B62D 15/0255 |

OTHER PUBLICATIONS

From CN App. No. 201610451707.3, Second Office Action, dated May 22, 2017, and its machine English translation from Global Dossier.

From CN App. No. 201610451707.3, Third Office Action, dated Aug. 29, 2018, and its machine English translation from Global Dossier.

* cited by examiner

LOCAL TRAJECTORY PLANNING METHOD AND APPARATUS FOR SMART VEHICLES

CROSS-REFERENCE TO RELATED APPLICATION

This application claims the priority to and the benefit of Chinese Patent Application No. CN201610451707.3 filed on Jun. 21, 2016, the disclosure of which is incorporated herein by reference in its entirety.

FIELD OF THE INVENTION

The present invention relates to the technical field of computer application, and particularly to a local trajectory planning method for a smart vehicle and a trajectory.

BACKGROUND OF THE INVENTION

A smart vehicle is a comprehensive system integrating functions such as environmental perception, planning decision and multi-level assisted driving so that the vehicle has a smart environment perception capability and can automatically analyze security and danger states of the run of the vehicle, and so that the vehicle reaches a destination according to a person's will and finally achieves the purpose of operating in place of a driver. In recent years, the smart vehicle has become a development and research hot spot in the field of world vehicle engineering and a new motive power for growth of vehicle industry, and many countries introduce it into their respective smart transportation systems for which they put focus on.

The smart vehicle will be confronted with various road structures and traffic conditions during travel, so how to achieve local trajectory planning of running vehicles has become a crucial technology in smart vehicle design. The current technology is limited to local control and planning such as obstacle avoidance, overtaking and lane change after sensors are used to acquire surrounding traffic conditions, and there are no better ways to implement local trajectory planning of the smart vehicle.

SUMMARY OF THE INVENTION

In view of this, the present invention provides a local trajectory planning method and apparatus for a smart vehicle.

Specific technical solutions are as follows:

The present invention provides a local trajectory planning method for a smart vehicle, pre-acquiring path planning information from a starting location to a destination; the method comprising:

determining a target lane;

sampling alternative curves from a current location of the smart vehicle to a target lane according to the path planning information;

performing speed planning for the sampled alternative curves according to a current travel environment;

selecting one of the alternative curves after the speed planning is performed as a target trajectory.

According to a preferred embodiment of the present invention, the method is executed cyclically or triggered by a specific event.

According to a preferred embodiment of the present invention, the determining the target lane comprises:

acquiring information of the target lane from the path planning information; or performing behavior decision-making based on the current travel environment, a behavior decision-making result comprising information of the target lane.

According to a preferred embodiment of the present invention, when the smart vehicle travels to a path having a plurality of lanes, executing the performing behavior decision-making based on the current travel environment.

According to a preferred embodiment of the present invention, the current travel environment includes road factor and surrounding traffic factor;

the road factor comprises one or any combinations of the following factors: whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently;

the surrounding traffic factor comprises one or any combinations of the following factors: a location, speed, category, and size of an obstacle within a preset range surrounding the location where the smart vehicle lies currently.

According to a preferred embodiment of the present invention, the performing the behavior decision-making comprises:

matching the current travel environment with a preset decision-making rule, and determining a matching behavior decision-making result; or inputting the current travel environment into a decision-making model and acquiring a decision-making result output by the decision-making model, the decision-making model being pre-built in a manner of employing machine learning.

According to a preferred embodiment of the present invention, the sampling alternative curves from a current location of the smart vehicle to a target lane according to the path planning information comprises:

acquiring information of the target lane from the path planning information;

determining an ending point range of the alternative curves in the target lane according to a current speed of the smart vehicle;

sampling ending points of the alternative curves in the ending point range, considering the current location of the smart vehicle as a starting point of the alternative curves, sampling respectively according to the starting point of the alternative curves and the ending points of the alternative curves, and forming the alternative curves.

According to a preferred embodiment of the present invention, upon sampling based on the starting point and ending points of the alternative curves, sampling based on a Euler spiral and forming alternative curves.

According to a preferred embodiment of the present invention, the sampling ending points of the alternative curves in the ending point range comprises:

performing equidistant sampling on a lane centerline within the ending point range to obtain ending points of respective alternative curves, the ending point directions and curvature of the alternative curves all being consistent with the target lane.

According to a preferred embodiment of the present invention, a starting point direction of the alternative curves accords with the current travel direction of the smart vehicle, and a starting point curvature of the alternative curves is determined by a current steering wheel turn angle and an axle distance of the smart vehicle.

According to a preferred embodiment of the present invention, the performing speed planning for the sampled alternative curves according to a current travel environment comprises:

if a distance between the smart vehicle and a vehicle ahead is smaller than a target following distance, performing uniform deceleration at a preset first acceleration on the alternative curve;

if the distance between the smart vehicle and the vehicle ahead is larger than the target following distance, performing uniform acceleration at a preset second acceleration on the alternative curve;

if the current speed of the smart vehicle is larger than a lane speed limit, performing uniform deceleration at a preset third acceleration on the alternative curve;

if the current speed of the smart vehicle is larger than a bend safe speed, performing uniform deceleration at a preset fourth acceleration on the alternative curve.

According to a preferred embodiment of the present invention, the selecting one of the alternative curves after the speed planning is performed as a target trajectory comprises:

performing evaluation for alternative curves after the speed planning and selecting an optimal alternative curve as a target trajectory, based on one or any combinations of the following factors:

distances between the alternative curves and an obstacle, curvature of the alternative curves, acceleration of the alternative curves and time consumed for completion of the alternative curves.

According to a preferred embodiment of the present invention, if the smart vehicle runs out of the planned path, triggering to perform path planning again and acquiring new path planning information, and performing subsequent local trajectory planning based on the new path planning information.

According to a preferred embodiment of the present invention, the method further comprises:

sending information of the target trajectory to a control system of the smart vehicle so that the control system controls the smart vehicle to travel along the target trajectory.

The present invention further provides a local trajectory planning apparatus for use in a smart vehicle, the apparatus comprising:

an interface module configured to acquire path planning information from a starting location to a destination;

a lane determining module configured to determine a target lane;

a curve sampling module configured to sample alternative curves from a current location of the smart vehicle to a target lane according to the path planning information;

a speed planning module configured to perform speed planning for the sampled alternative curve according to the current travel environment;

a trajectory selection module configured to select one of the alternative curves after the speed planning is performed as a target trajectory.

According to a preferred embodiment of the present invention, the apparatus executes processing cyclically or execute processing due to trigger of a specific event.

According to a preferred embodiment of the present invention, the lane determining module is specifically configured to acquire target lane information from the path planning information; or acquire target lane information from a behavior decision-making result of a behavior decision-making module;

the behavior decision-making module is configured to perform behavior decision-making based on the current travel environment.

According to a preferred embodiment of the present invention, when the smart vehicle travels to a path having a plurality of lanes, the behavior decision-making module performs behavior decision-making.

According to a preferred embodiment of the present invention, the current travel environment includes road factor and surrounding traffic factor;

the road factor comprises one or any combinations of the following factors: whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently;

the surrounding traffic factor comprises one or any combinations of the following factors: a location, speed, category, and size of an obstacle within a preset range surrounding the location where the smart vehicle lies currently.

According to a preferred embodiment of the present invention, upon performing behavior decision-making, the behavior decision-making module is specifically configured to:

match the current travel environment with a preset decision-making rule, and determine a matching behavior decision-making result; or input the current travel environment into a decision-making model and acquire a decision-making result output by the decision-making model, the decision-making model being pre-built in a manner of employing machine learning.

According to a preferred embodiment of the present invention, the curve sampling module is specifically configured to:

acquire information of the target lane from the path planning information;

determine an ending point range of the alternative curves in the target lane according to a current speed of the smart vehicle;

sample ending points of the alternative curves in the ending point range, consider the current location of the smart vehicle as a starting point of the alternative curves, sample respectively according to the starting point of the alternative curves and the ending points of the alternative curves, and form the alternative curves.

According to a preferred embodiment of the present invention, upon sampling based on the starting point and ending points of the alternative curves, the curve sampling module samples based on a Euler spiral and forms alternative curves.

According to a preferred embodiment of the present invention, the curve sampling module performs equidistant sampling on a lane centerline within the ending point range to obtain ending points of respective alternative curves, and the ending point directions and curvature of the alternative curves are all consistent with the target lane.

According to a preferred embodiment of the present invention, a starting point direction of the alternative curves accords with the current travel direction of the smart vehicle, and a starting point curvature of the alternative curves is determined by a current steering wheel turn angle and an axle distance of the smart vehicle.

According to a preferred embodiment of the present invention, speed planning performed by the speed planning module includes:

if a distance between the smart vehicle and a vehicle ahead is smaller than a target following distance, performing uniform deceleration at a preset first acceleration on the alternative curve;

if the distance between the smart vehicle and the vehicle ahead is larger than the target following distance, performing uniform acceleration at a preset second acceleration on the alternative curve;

if the current speed of the smart vehicle is larger than a lane speed limit, performing uniform deceleration at a preset third acceleration on the alternative curve;

if the current speed of the smart vehicle is larger than a bend safe speed, performing uniform deceleration at a preset fourth acceleration on the alternative curve.

According to a preferred embodiment of the present invention, the speed planning module is specifically configured to perform evaluation for alternative curves after the speed planning and select an optimal alternative curve as a target trajectory, based on one or any combinations of the following factors:

distances between the alternative curves and an obstacle, curvature of the alternative curves, acceleration of the alternative curves and time consumed for completion of the alternative curves.

According to a preferred embodiment of the present invention, the apparatus further comprises: a travel trajectory monitoring module configured to monitor a travel trajectory of the smart vehicle; if the smart vehicle runs out of the planned path, it triggers map-class services to perform path planning again and triggers the interface module to acquire new path planning information.

According to a preferred embodiment of the present invention, the trajectory selection module is further configured to send information of the target trajectory to a control system of the smart vehicle so that the control system controls the smart vehicle to travel along the target trajectory.

As can be seen from the above technical solutions, in the present invention after the target lane is determined, alternative lanes from the current location of the smart vehicle to the target lane are sampled according to the path planning information, path planning is performed for the sampled alternative curves according to the current travel environment, and one alternative curve is selected from alternative curves after the speed planning is performed, thereby achieving local trajectory planning of the smart vehicle.

DETAILED DESCRIPTION OF PREFERRED EMBODIMENTS

The present invention will be described in detail in conjunction with figures and specific embodiments to make objects, technical solutions and advantages of the present invention clearer.

Terms used in embodiments of the present invention are only intended to describe specific embodiments, not to limit the present invention. "a", "said" and "the" in singular forms used in embodiments and appended claims of the present invention are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determination" or "responsive to detection". Similarly, depending on the context, phrases "if . . . is determined" or "if (a stated condition or event) . . . is detected" may be construed as "when . . . is determined" or "responsive to determination" or "when (a stated condition or event) . . . is detected" or "responsive to detection of (stated condition or event)".

The present invention is used for local trajectory planning of the smart vehicle. First, "path" and "trajectory" are distinguished. "Path" refers to a navigation route from a starting point to a destination, only includes road information and does not include characteristics such as precise location (e.g., coordinates), speed and time. However, "trajectory" refers to a series of precise location points on a road surface and carries characteristics such as speed and time. Path planning already can be implemented through map-class services and is usually overall planning. What is implemented by the present invention is local trajectory planning.

Figure 1:
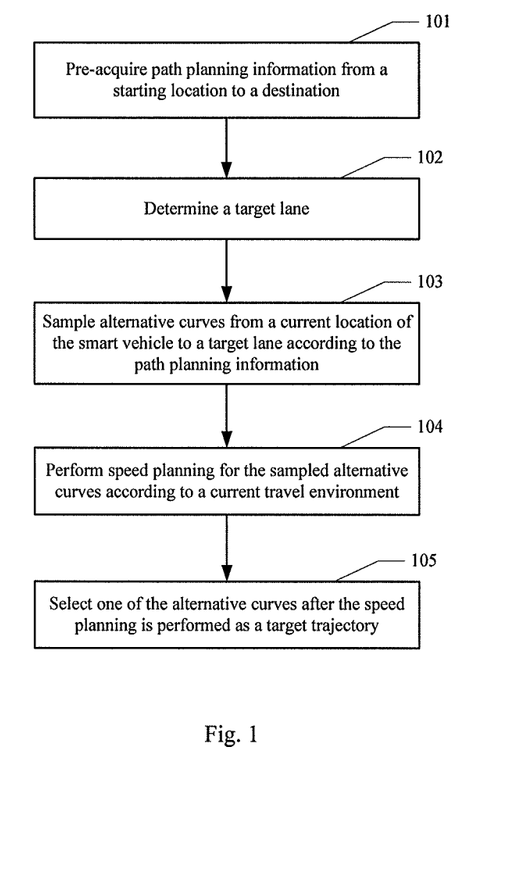
FIG. 1 is a flow chart of a main method according to an embodiment of the present invention.

FIG. 1 is a flow chart of a main method according to an embodiment of the present invention. As shown in FIG. 1, the method mainly comprises the following steps:

In step 101 is pre-acquired path planning information from a starting location to a destination.

Path planning may be implemented by employing the currently-existing technologies. The present invention does not limit a path planning manner. Most of current map-class services (including navigation-class services) all can implement the path planning from a starting location to a destination. Path planning information includes a navigation path from the starting location to the destination. The path is a pathway from beginning to ending. However, if one road includes a plurality of lanes, path planning information will not be selected therefrom and only includes road information. In addition, since map-class services, particularly high-precision map-class services, have high-precision road information, path planning information may include information of lanes included by the road, for example, positions of lane lines, lane curvature, lane speed limit, lane connection attributes and the like.

For example, assume that a starting location is Houyangcun Road and a destination is Aolin West Road, the path planning information may be: Houyangcun Road, three lanes, turn right to a ramp, speed limit 40 km; travel 200 meters and then turn left into G7 main road which include four lanes with a speed limit 80 km; travel 5 km and then turn right into a ramp, with a speed limit 50 km; drive 200 meters and then take a left ramp where the ramp is forked; drive 500 meters and then turn left into a main road of the Fifth Ring Road which has four lanes with a speed limit 100 km.

The following steps are steps for implementing local trajectory planning. The local trajectory planning may be performed cyclically during the drive of the smart vehicle, e.g., performed one time every 100 milliseconds. The local trajectory planning may also be triggered by a specific event, e.g., when the driving behavior (e.g., overtake, change lane or the like) of the smart vehicle needs to be altered upon selection of a lane, or after a behavior decision-making.

In step 102, a target lane is determined.

The step mainly comprises but is not limited to the following two manners:

The first manner: acquiring target lane information from the path planning information. As mentioned above, the path planning information only includes road information such as the number of lanes, but does not perform lane selection. However, some roads only include one lane in the travel direction of the smart vehicle, and this lane may be directly taken as the target lane in this case.

The second manner: when there are a plurality of lanes for selection or lane change needs to be performed, behavior decision-making needs to be performed according to the current travel environment, and the behavior decision-making result includes target lane information. For example, if the behavior decision-making result indicates leftward lane change, the target lane is the left lane adjacent to the lane where the smart vehicle lies currently.

In step 103, alternative curves from the current location of the smart vehicle to the target lane are sampled according to the path planning information.

After the target lane is determined, many trajectories might exist from the current location of the smart vehicle to the target lane, and one trajectory needs to be chosen therefrom. In this step, a plurality of alternative curves are sampled in a sampling manner, and each alternative curve is comprised of many points. The alternative curve means that the smart vehicle may run along the alternative curve to the target lane. The alternative curve-sampling manner will be detailed in subsequent embodiments.

In step 104, speed planning is performed for the sampled alternative curve according to the current travel environment.

It does not suffice that the alternative curve only includes location information. Speed needs to be taken into account when the smart vehicle drives along the alternative curve. That is, thought should be given to a speed on which the smart vehicle drives on the alternative curve. Hence, there is a need to perform speed planning for the sampled alternative curve. Thoughts are mainly given to the current travel environment such as conditions of vehicles ahead of the smart vehicle, road speed limit and the like when speed planning is performed. A specific speed planning manner will be detailed in subsequent embodiments.

In step 105, one of the alternative curves after the speed planning is performed is selected as a target trajectory.

In this step, when one is selected from the plurality of alternative curves as the target trajectory, evaluation may be made for the alternative curves after the speed planning is performed, and an optimal alternative curve is selected according to an evaluation result. The so-called evaluation in fact means performing comparison and judgment for merits and demerits of the alternative curves. A specific evaluation manner will be detailed in subsequent embodiments.

Figure 2:
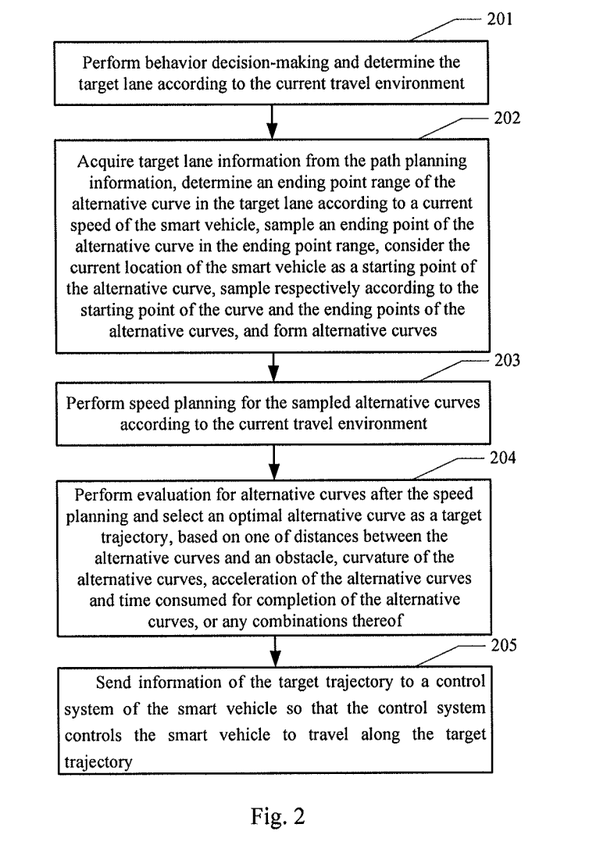
FIG. 2 is a detailed flow for implementing a method according to an embodiment of the present invention.

The above are the main implementation of the present invention. A specific implementation of the above method is described in detail in conjunction with a specific embodiment. FIG. 2 is a detailed flow for implementing a method according to an embodiment of the present invention. As shown in FIG. 2, after the path planning information from the starting location to the destination is acquired from the high-precision map services, the following steps are executed cyclically or due to the trigger of a specific event:

In step 201, performing behavior decision-making and determining the target lane according to the current travel environment.

The current travel environment mainly includes two factors: road factor and surrounding traffic factor, wherein the road factor may comprise one of factors such as whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently, or any combinations thereof. The surrounding traffic factor may comprise one of for example a location, speed, category, and size of an obstacle within a preset range surrounding the location where the smart vehicle lies currently, or any combinations thereof.

Upon behavior decision-making, the decision-making results are mainly driving behaviors such as car following, lane change, turning, or getting onto or off the ramp. A specific behavior decision-making may employ, but is not limited to the following two manners:

The first manner: matching the current travel environment with a preset decision-making rule, and determining a matching behavior decision-making result. That is to say, combinations of the above various factors are made correspond to respective decision-making results, and this correspondence is a decision-making rule. When the behavior decision-making needs to be performed, the current travel environment of the smart vehicle is matched with the decision-making rule to result in a decision-making result.

The second manner: inputting the current travel environment into a decision-making model and acquiring a decision-making result output by the decision-making model. That is, some sample data are collected in advance, factors of the above current travel environment are extracted as features, and the decision-making model is trained in a manner of employing machine learning. When real-time behavior decision-making needs to be performed for the smart vehicle, the current travel environment of the smart vehicle is extracted, and factors of the current travel environment are input, as features, into the decision-making model to obtain the decision-making result output by the decision-making model.

Information of the target lane can be determined through the behavior decision-making. For example, if the behavior decision-making result is changing to a left lane, the target lane is a left lane adjacent to the lane where the smart vehicle lies currently. If the behavior decision-making result is changing to a right lane, the target lane is a right lane adjacent to the lane where the smart vehicle lies currently. If the behavior decision-making result is limiting speed, turning or the like, the target lane is still the lane where the smart vehicle lies currently.

In step 202, acquiring target lane information from the path planning information, determining an ending point range of the alternative curve in the target lane according to a current speed of the smart vehicle, sampling an ending point of the alternative curve in the ending point range, considering the current location of the smart vehicle as a starting point of the alternative curve, sampling respectively according to the starting point of the curve and the ending points of the alternative curves, and forming alternative curves.

The form of the alternative curves may employ Euler spiral, Bezier curve, spline curve or the like. Take Euler spiral as an example. Once the type of the alternative curve is determined, the alternative curve starting point and the alternative curve ending point are determined and then the alternative curve can be determined.

The starting point of the alternative curve is the current location of the smart vehicle, a starting point direction accords with the current travel direction of the smart vehicle, and a starting point curvature is determined by a current steering wheel turn angle and an axle distance of the smart vehicle. For example, the starting point curvature K may employ the following formula:

$$K = \frac{\tan(\alpha)}{L}$$

Wherein, $\alpha$ is a front wheel turn angle, it is in a certain proportional relationship to the steering wheel turn angle, and this relationship depends on the design of the smart vehicle itself. L is determined by a distance between front and rear axles of the smart vehicle.

The focus is the sampling of the alternative curve ending point. First, the target lane information, namely, location information of the target lane, may be acquired from the path planning information. Since the alternative curve aims to enable the smart vehicle to run stably on the target lane, a suitable range needs to be determined, and the ending point of the alternative curve need fall within the range. The range is decided by a current speed of the smart vehicle. When the current speed of the smart vehicle is large, the range is farther away from the current location of the smart vehicle, and closer to the current location of the smart vehicle on the contrary. The range may be determined based on empirical rules. After the ending point range is determined, equidistant sampling may be performed on a lane centerline within the ending point range to obtain ending points of respective alternative curves. The number of ending points indicates the number of alternative curves. The ending point directions and curvature directions of the alternative curves are all consistent with the target lane.

Figure 3:
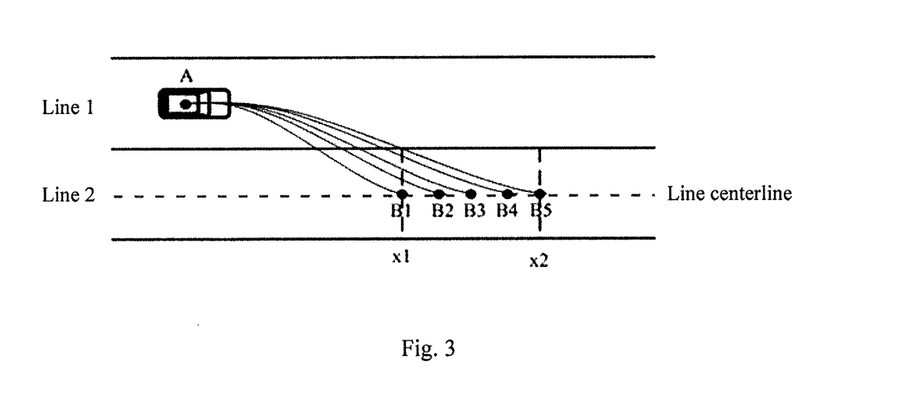
FIG. 3 is schematic diagram of sampling of an alternative curve according to an embodiment of the present invention.

As shown in FIG. 3, assume that the smart vehicle is currently on lane 1 and the target lane is lane 2, a current location A of the smart vehicle is the curve starting point. The ending point range of the alternative curve is determined as a range of x1-x2 according to a current vehicle speed of the smart vehicle. Equidistant sampling is performed along the lane centerline within the range. Five points B1, B2, B3, B4 and B5 are sampled respectively as alternative curve ending points, sampling of other points on the alternative curves is performed according to Euler spiral, and then five alternative curves are formed.

In step 203, speed planning is performed for the sampled alternative curves according to the current travel environment.

In this step, thoughts are mainly given to factors such as a distance between the smart vehicle and a vehicle ahead and security speed limit and this step mainly comprises but is not limited to the following processing:

If the distance between the smart vehicle and the vehicle ahead is smaller than a target following distance, performing uniform deceleration at a preset first acceleration on the alternative curve.

Wherein the target following distance may be determined by a speed of the vehicle ahead and a safe time interval, for example, by a product of the speed of the vehicle ahead and the safe time interval. The safe time interval usually employs 3 seconds.

If the distance between the smart vehicle and the vehicle ahead is larger than the target following distance, performing uniform acceleration at a preset second acceleration on the alternative curve.

The above two speed planning manners are intended to prevent the smart vehicle from colliding with the vehicle ahead during travel.

If the current speed of the smart vehicle is larger than the lane speed limit, performing uniform deceleration at a preset third acceleration on the alternative curve.

If the current speed of the smart vehicle is larger than a bend safe speed, performing uniform deceleration at a preset fourth acceleration on the alternative curve. The bend safety speed may be determined by a lane speed limit and a lane curvature.

The first acceleration, the second acceleration, the third acceleration and the fourth acceleration may take an empirical value. The speed planning for the alternative curve is chiefly consideration based on safety, stability and comfort.

In step 204, based on one of distances between the alternative curves and an obstacle, curvature of the alternative curves, acceleration of the alternative curves and time consumed for completion of the alternative curves, or any combinations thereof, performing evaluation for alternative curves after the speed planning and selecting an optimal alternative curve as a target trajectory.

Reference is made to some indices when the alternative curves are evaluated. Some indices are depicted below one by one:

1) The distances between the alternative curves and the obstacle. Certainly, the alternative curves are better if the distances away from the obstacle are larger. The obstacle may be a vehicle, pedestrian, traffic barrier, building or the like.

2) Curvature of alternative curves. The smaller the curvature of the alternative curves is, the better the alternative curves are, and a batter stability is achieved upon travel according to the curve. In addition, as the smart vehicle is limited to a minimum steering radius, when the curvature of alternative curves is larger than a certain value, the smart vehicle cannot proceed. Hence, it is feasible to delete alternative curves whose curvature is larger than a preset threshold and refrain them away from selection of the target trajectory.

3) Acceleration of alternative curves. When the acceleration is smaller, the driver and passengers' comfort is higher and therefore the alternative curves are better.

4) Time consumed for completion of alternative curves. It is easier to understand that the alternative curves are better if time consumed for completion of the alternative curves is shorter.

It is feasible to comprehensively consider several of the above indices, score the alternative curves respectively according to the above indices, then perform weighting processing for scores of the indices to obtain scores of the alternative curves, and then select therefrom one alternative curve whose score is optimal as the target trajectory.

In step 205, information of the target trajectory is sent to a control system of the smart vehicle so that the control system controls the smart vehicle to travel along the target trajectory.

Upon reception of the information of the target trajectory, the control system, according to the information of the target trajectory, determines control parameters for a steering wheel turn angle, brake and gas pedal of the smart vehicle, then controls the steering wheel, brake and gas pedal according to these control parameters, so that the smart vehicle finally travels along the target trajectory. The present invention does not limit how the control system specifically determines the control parameters according to the information of the target trajectory.

In addition, in embodiments of the present invention, a travel state of the smart vehicle may be monitored in real time. If the smart vehicle runs out of the planned path, it will trigger map-class services to perform path planning again for the smart vehicle, whereupon the starting location of the path to be planned is the current location of the smart vehicle. Furthermore, subsequent local trajectory planning is performed based on new path planning information.

The above are detailed depictions of the method according to the present invention. The apparatus according to the present invention will be described below in detail in conjunction with embodiments.

Figure 4:
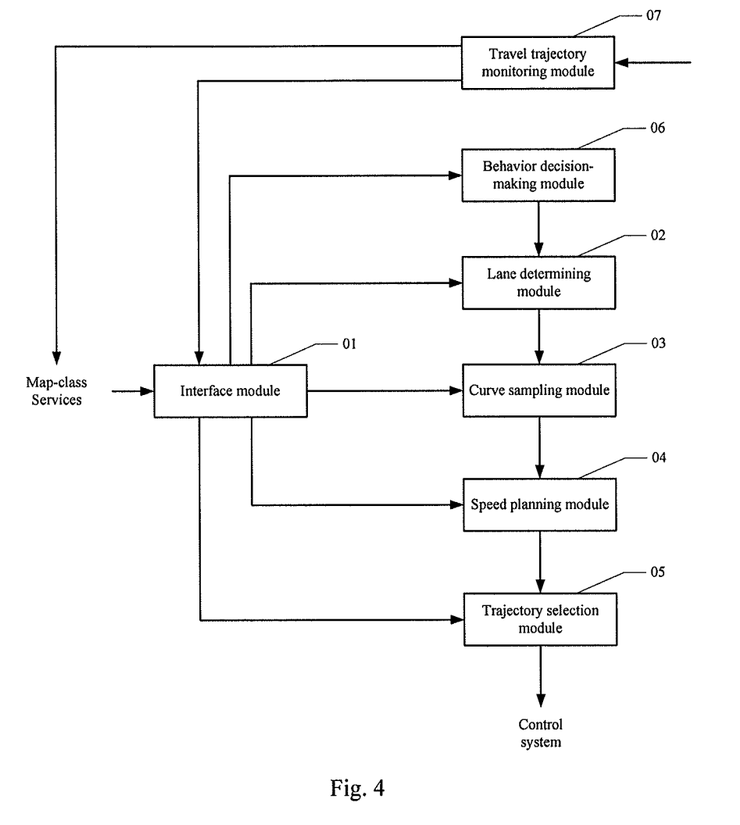
FIG. 4 is a block diagram of an apparatus according to an embodiment of the present invention.

FIG. 4 is a block diagram of an apparatus according to an embodiment of the present invention. The apparatus may execute processing cyclically or execute processing due to trigger of a specific event. As shown in FIG. 4, the apparatus may comprises: an interface module 01, a lane determining module 02, a curve sampling module 03, a speed planning module 04 and a trajectory selection module 05. The apparatus may further comprise a behavior decision-making module 06 and a travel trajectory monitoring module 07. Main functions of respective modules are as follows:

The interface module 01 is responsible for acquiring path planning information from a starting location to a destination, the path planning information being acquired from map-class services, e.g., from a high-precision map module in the smart vehicle.

The lane determining module 02 is responsible for determining a target lane. The lane determining module 02 may employ but is not limited to the following manners:

The first manner: acquiring target lane information from the path planning information. The path planning information includes road information such as the number of lanes, but does not perform lane selection. However, some roads only include one lane in the travel direction of the smart vehicle, and this lane may be directly taken as the target lane in this case.

The second manner: acquiring target lane information from a behavior decision-making result of a behavior decision-making module. The behavior decision-making module 06 is responsible for performing behavior decision-making based on the current travel environment. When the smart vehicle travels to a path having a plurality of lanes, the behavior decision-making module 06 may begin behavior decision-making.

Wherein the current travel environment may include road factor and surrounding traffic factor. The road factor may comprise one or any combinations of the following factors: whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently. The surrounding traffic factor comprises one or any combinations of the following factors: a location, speed, category, and size of an obstacle within a preset range surrounding the location where the smart vehicle lies currently.

When the behavior decision-making module 06 performs behavior decision-making, the decision-making results are mainly driving behaviors such as car following, lane change, turning, or getting onto or off the ramp. A specific behavior decision-making may employ, but is not limited to the following two manners:

The first manner: matching the current travel environment with a preset decision-making rule, and determining a matching behavior decision-making result.

The second manner: inputting the current travel environment into a decision-making module and acquiring a decision-making result output by the decision-making model. The decision-making model is pre-built in a manner of employing machine learning.

The curve sampling module 03 is responsible for sampling alternative curves from the current location of the smart vehicle to a target lane according to the path planning information.

Specifically, the curve sampling module 03 may first acquire target lane information from the path planning information, determine an ending point range of the alternative curves in the target lane according to a current speed of the smart vehicle, sample ending points of the alternative curves in the ending point range, consider the current location of the smart vehicle as a starting point of the alternative curves, sample respectively according to the starting point of the alternative curves and the ending points of the alternative curves, and form the alternative curves.

Wherein the curve sampling module 03 may sample based on a Euler spiral upon sampling based on the starting point and ending points of the alternative curves. In addition to the Euler spiral, the alternative curves may further employ Bezier curve, spline curve or the like.

Upon sampling ending points of the alternative curves, the curve sampling module 03 performs equidistant sampling on a lane centerline within the ending point range to obtain ending points of respective alternative curves. The ending point directions and curvature of the alternative curves are consistent with the target lane.

A starting point direction of the alternative curves accords with the current travel direction of the smart vehicle, and a starting point curvature of the alternative curves is determined by a current steering wheel turn angle and an axle distance of the smart vehicle.

The speed planning module 04 is responsible for performing speed planning for the sampled alternative curve according to the current travel environment.

The speed planning module 04 mainly considers factors such as a distance between the smart vehicle and a vehicle ahead and security speed limit, and mainly comprises but is not limited to the following processing:

If the distance between the smart vehicle and the vehicle ahead is smaller than a target following distance, performing uniform deceleration at a preset first acceleration on the alternative curve.

Wherein the target following distance may be determined by a speed of the vehicle ahead and a safe time interval, for example, by a product of the speed of the vehicle ahead and the safe time interval. The safe time interval usually employs 3 seconds.

If the distance between the smart vehicle and the vehicle ahead is larger than the target following distance, performing uniform acceleration at a preset second acceleration on the alternative curve.

The above two speed planning manners are intended to prevent the smart vehicle from colliding with the vehicle ahead during travel.

If the current speed of the smart vehicle is larger than the lane speed limit, performing uniform deceleration at a preset third acceleration on the alternative curve.

If the current speed of the smart vehicle is larger than a bend safe speed, performing uniform deceleration at a preset fourth acceleration on the alternative curve. The bend safety speed may be determined by a lane speed limit and a lane curvature.

The first acceleration, the second acceleration, the third acceleration and the fourth acceleration may take an empirical value.

The trajectory selection module 05 is responsible for selecting one of the alternative curves after the speed planning is performed as a target trajectory. Specifically, it is feasible to perform evaluation for alternative curves after the speed planning and select an optimal alternative curve as a target trajectory, based on one of distances between the alternative curves and an obstacle, curvature of the alternative curves, acceleration of the alternative curves and time consumed for completion of the alternative curves, or any combinations thereof. Indices to which reference is made upon evaluation are already described in detail in the above method embodiment, and will not be detailed here.

The trajectory selection module 05 may send information of the target trajectory to a control system of the smart vehicle so that the control system controls the smart vehicle to travel along the target trajectory. Upon reception of the information of the target trajectory, the control system, according to the information of the target trajectory, determines control parameters for a steering wheel turn angle, brake and gas pedal of the smart vehicle, then controls the steering wheel, brake and gas pedal according to these control parameters, so that the smart vehicle finally travels along the target trajectory. The present invention does not limit how the control system specifically determines the control parameters according to the information of the target trajectory.

The travel trajectory monitoring module 07 is responsible for monitoring a travel trajectory of the smart vehicle. If the smart vehicle runs out of the planned path, it will trigger map-class services to perform path planning again and trigger the interface module to acquire new path planning information. The lane determining module 02, curve sampling module 03, the speed planning module 04 and trajectory selection module 05 perform processing based on new path planning information and thereby perform local trajectory planning.

The above apparatus according to the embodiment of the present invention may be application located in the smart vehicle, or may be function units such as plug-in or software development kit (SDK) located in the application of the smart vehicle, or may be located at a server end. This is not particularly limited by embodiments of the present invention.

As can be from the above depictions, the above method and apparatus according to the present invention may have the following advantages:

1) automatically implementing local trajectory planning of the smart vehicle.

2) extensively utilizing path planning information, namely, using high-precision map-class service data so that there is no need to detect lane information such as location, speed limit and curvature of the lane in real time during performance of local trajectory planning, and there is no need to search for how to reach the destination in real time, thereby reducing calculation amount of the local trajectory planning and meanwhile improving reliability of local trajectory planning.

3) during local trajectory planning, thoughts are given to many factors such as road structure, the current travel environment, and dynamics constraints of the vehicle itself so that the trajectory planning is made more precise and reliable and thereby full-distance automatic driving is achieved. This technology provides technical basis for the smart vehicle to complete driving actions on various road structures without any manual intervention, and ensures real time, safety, comfortableness and accessibility of local trajectory planning.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized as hardware, or they can be realized with hardware and software functional unit.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present invention. The aforementioned storage medium includes various media that may store program codes, such as U disk, removable hard disk, read-only memory (ROM), a random access memory (RAM), magnetic disk, or an optical disk.

The foregoing is only preferred embodiments of the present invention, not intended to limit the invention. Any modifications, equivalent replacements, improvements and the like made within the spirit and principles of the present invention, should all be included in the present invention within the scope of protection.

What is claimed is:

1. A local trajectory planning method for a smart vehicle, wherein path planning information from a starting location to a destination is pre-acquired; the method comprising:
   determining a target lane;
   sampling alternative curves from a current location of the smart vehicle to a target lane according to the path planning information;
   performing speed planning for the sampled alternative curves according to a current travel environment;

selecting one of the alternative curves after the speed planning is performed as a target trajectory, wherein a starting point direction of the alternative curves accords with the current travel direction of the smart vehicle, and a starting point curvature of the alternative curves is determined by a current steering wheel turn angle and an axle distance of the smart vehicle.

2. The method according to claim 1, wherein the method is executed cyclically or triggered by a specific event.

3. The method according to claim 1, wherein the determining the target lane comprises:

acquiring information of the target lane from the path planning information; or performing behavior decision-making based on the current travel environment, a behavior decision-making result comprising information of the target lane.

4. The method according to claim 3, wherein when the smart vehicle travels to a path having a plurality of lanes, executing the performing behavior decision-making based on the current travel environment.

5. The method according to claim 3, wherein the current travel environment includes road factor and surrounding traffic factor;

the road factor comprises one or any combinations of the following factors: whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently;

the surrounding traffic factor comprises one or any combinations of the following factors: a location, speed, category, and size of an obstacle within a preset range surrounding the location where the smart vehicle lies currently.

6. The method according to claim 3, wherein the performing behavior decision-making comprises:

matching the current travel environment with a preset decision-making rule, and determining a matching behavior decision-making result; or inputting the current travel environment into a decision-making model and acquiring a decision-making result output by the decision-making model, the decision-making model being pre-built in a manner of employing machine learning.

7. The method according to claim 1, wherein the sampling alternative curves from a current location of the smart vehicle to a target lane according to the path planning information comprises:

acquiring information of the target lane from the path planning information;

determining an ending point range of the alternative curves in the target lane according to a current speed of the smart vehicle;

sampling ending points of the alternative curves in the ending point range, considering the current location of the smart vehicle as a starting point of the alternative curves, sampling respectively according to the starting point of the alternative curves and the ending points of the alternative curves, and forming the alternative curves.

8. The method according to claim 7, wherein upon sampling based on the starting point and ending points of the alternative curves, sampling based on a Euler spiral and forming alternative curves.

9. The method according to claim 7, wherein the sampling ending points of the alternative curves in the ending point range comprises:

performing equidistant sampling on a lane centerline within the ending point range to obtain ending points of respective alternative curves, the ending point directions and curvature of the alternative curves all being consistent with the target lane.

10. The method according to claim 1, wherein the performing speed planning for the sampled alternative curves according to a current travel environment comprises:

when a distance between the smart vehicle and a vehicle ahead is smaller than a target following distance, performing uniform deceleration at a preset first acceleration on the alternative curve;

when the distance between the smart vehicle and the vehicle ahead is larger than the target following distance, performing uniform acceleration at a preset second acceleration on the alternative curve;

when the current speed of the smart vehicle is larger than a lane speed limit, performing uniform deceleration at a preset third acceleration on the alternative curve;

when the current speed of the smart vehicle is larger than a bend safe speed, performing uniform deceleration at a preset fourth acceleration on the alternative curve.

11. The method according to claim 1, wherein the selecting one of the alternative curves after the speed planning is performed as a target trajectory comprises:

performing evaluation for alternative curves after the speed planning and selecting an optimal alternative curve as a target trajectory, based on one or any combinations of the following factors:

distances between the alternative curves and an obstacle, curvature of the alternative curves, acceleration of the alternative curves and time consumed for completion of the alternative curves.

12. The method according to claim 1, wherein when the smart vehicle runs out of the planned path, triggering to perform path planning again and acquiring new path planning information, and performing subsequent local trajectory planning based on the new path planning information.

13. The method according to claim 1, wherein the method further comprises:

sending information of the target trajectory to a control system of the smart vehicle so that the control system controls the smart vehicle to travel along the target trajectory.

14. A local trajectory planning apparatus for use in a smart vehicle, the apparatus comprising:

at least one processor; and a memory storing instructions, which when executed by the at least one processor, cause the at least one processor to perform operations, the operations comprising:

determining a target lane;

sampling alternative curves from a current location of the smart vehicle to a target lane according to the path planning information;

performing speed planning for the sampled alternative curves according to a current travel environment;

selecting one of the alternative curves after the speed planning is performed as a target trajectory, wherein a starting point direction of the alternative curves accords with the current travel direction of the smart vehicle, and a starting point curvature of the alternative curves is determined by a current steering wheel turn angle and an axle distance of the smart vehicle.

15. The apparatus according to claim 14, wherein the operations are executed cyclically or triggered by a specific event.

16. The apparatus according to claim 14, wherein the operation of determining the target lane comprises:
   acquiring information of the target lane from the path planning information; or
   performing behavior decision-making based on the current travel environment, a behavior decision-making result comprising information of the target lane.

17. The apparatus according to claim 16, wherein when the smart vehicle travels to a path having a plurality of lanes, the operation or performing behavior decision-making based on the current travel environment is executed.

18. The apparatus according to claim 16, wherein the current travel environment includes road factor and surrounding traffic factor;
   the road factor comprises one or any combinations of the following factors: whether a lane where the smart vehicle lies currently may reach the destination, a remaining travel distance of the lane where the smart vehicle lies currently, whether there is an available lane on the left side of the lane where the smart vehicle lies currently, whether there is an available lane on the right side of the lane where the smart vehicle lies currently, information about lanes accessible to the destination on the road segment where the smart vehicle lies currently, and information about the lane having a maximum remaining travel distance on the road segment where the smart vehicle lies currently;
   the surrounding traffic factor comprises one or any combinations of the following factors: a location, speed, category, and size of an obstacle within a preset range surrounding the location where the smart vehicle lies currently.

19. The apparatus according to claim 16, wherein the operation of performing behavior decision-making comprises:
   matching the current travel environment with a preset decision-making rule, and determining a matching behavior decision-making result; or
   inputting the current travel environment into a decision-making model and acquiring a decision-making result output by the decision-making model, the decision-making model being pre-built in a manner of employing machine learning.

20. The apparatus according to claim 14, wherein the operation of sampling alternative curves from a current location of the smart vehicle to a target lane according to the path planning information comprises:
   acquiring information of the target lane from the path planning information;
   determining an ending point range of the alternative curves in the target lane according to a current speed of the smart vehicle;
   sampling ending points of the alternative curves in the ending point range, considering the current location of the smart vehicle as a starting point of the alternative curves, sampling respectively according to the starting point of the alternative curves and the ending points of the alternative curves, and forming the alternative curves.

21. The apparatus according to claim 20, wherein upon sampling based on the starting point and ending points of the alternative curves, sampling based on a Euler spiral and forming alternative curves.

22. The apparatus according to claim 20, wherein the operation of sampling ending points of the alternative curves in the ending point range comprises:
   performing equidistant sampling on a lane centerline within the ending point range to obtain ending points of respective alternative curves, the ending point directions and curvature of the alternative curves all being consistent with the target lane.

23. The apparatus according to claim 14, wherein the operation of performing speed planning for the sampled alternative curves according to a current travel environment comprises:
   when a distance between the smart vehicle and a vehicle ahead is smaller than a target following distance, performing uniform deceleration at a preset first acceleration on the alternative curve;
   when the distance between the smart vehicle and the vehicle ahead is larger than the target following distance, performing uniform acceleration at a preset second acceleration on the alternative curve;
   when the current speed of the smart vehicle is larger than a lane speed limit, performing uniform deceleration at a preset third acceleration on the alternative curve;
   when the current speed of the smart vehicle is larger than a bend safe speed, performing uniform deceleration at a preset fourth acceleration on the alternative curve.

24. The apparatus according to claim 14, wherein the operation of selecting one of the alternative curves after the speed planning is performed as a target trajectory comprises:
   performing evaluation for alternative curves after the speed planning and selecting an optimal alternative curve as a target trajectory, based on one or any combinations of the following factors:
   distances between the alternative curves and an obstacle, curvature of the alternative curves, acceleration of the alternative curves and time consumed for completion of the alternative curves.

25. The apparatus according to claim 14, wherein when the smart vehicle runs out of the planned path, triggering to perform path planning again and acquiring new path planning information, and performing subsequent local trajectory planning based on the new path planning information.

26. The apparatus according to claim 14, the operation further comprises:
   sending information of the target trajectory to a control system of the smart vehicle so that the control system controls the smart vehicle to travel along the target trajectory.

27. A computer storage medium, wherein the computer storage medium is coded with a computer program, and when the program is executed by one or more computers, the one or more computers perform the following operations:
   determining a target lane;
   sampling alternative curves from a current location of the smart vehicle to a target lane according to the path planning information;
   performing speed planning for the sampled alternative curves according to a current travel environment;
   selecting one of the alternative curves after the speed planning is performed as a target trajectory,
   wherein a starting point direction of the alternative curves accords with the current travel direction of the smart vehicle, and a starting point curvature of the alternative curves is determined by a current steering wheel turn angle and an axle distance of the smart vehicle.

\* \* \* \* \*